(12) United States Patent
Cook

(10) Patent No.: US 9,121,758 B2
(45) Date of Patent: Sep. 1, 2015

(54) FOUR-AXIS GIMBALED AIRBORNE SENSOR HAVING A SECOND COELOSTAT MIRROR TO ROTATE ABOUT A THIRD AXIS SUBSTANTIALLY PERPENDICULAR TO BOTH FIRST AND SECOND AXES

(71) Applicant: Raytheon Company, Waltham, MA (US)

(72) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 236 days.

(21) Appl. No.: 13/951,988

(22) Filed: Jul. 26, 2013

(65) Prior Publication Data

US 2015/0028194 A1    Jan. 29, 2015

(51) Int. Cl.
| | |
|---|---|
| *H01J 3/14* | (2006.01) |
| *G01J 1/04* | (2006.01) |
| *G01S 17/02* | (2006.01) |
| *G01S 7/481* | (2006.01) |
| *G02B 27/64* | (2006.01) |
| *G01S 17/42* | (2006.01) |

(52) U.S. Cl.
CPC ............. *G01J 1/0407* (2013.01); *G01J 1/0403* (2013.01); *G01S 7/4817* (2013.01); *G01S 17/023* (2013.01); *G02B 27/644* (2013.01); *G01S 17/42* (2013.01)

(58) Field of Classification Search
CPC ........ G02B 27/01; G02B 27/64; G02B 6/272; G01B 11/002; G01J 1/0403; G01J 1/0407
USPC ................ 250/216, 239, 221, 214 VT, 214.1; 356/141.1–141.5, 607–614; 359/212–217
See application file for complete search history.

(56) References Cited

U.S. PATENT DOCUMENTS

| | | | |
|---|---|---|---|
| 4,404,592 A | 9/1983 | Pepin et al. | |
| 7,230,724 B2 * | 6/2007 | Jokinen et al. | ................ 356/608 |
| 2007/0177288 A1 | 8/2007 | Foote | |
| 2009/0109561 A1 | 4/2009 | Cook | |
| 2012/0292482 A1 | 11/2012 | Cook et al. | |

FOREIGN PATENT DOCUMENTS

| | | |
|---|---|---|
| EP | 0050539 A1 | 4/1982 |
| EP | 2525235 A1 | 11/2012 |

OTHER PUBLICATIONS

Hilkert et al., A Unique Three-Axis Gimbal Mechanism, Proceeding of Spie, vol. 6971, Apr. 3, 2014, pp. 69710E-69710E8, 8 pages.

* cited by examiner

*Primary Examiner* — Que T Le
(74) *Attorney, Agent, or Firm* — Lando & Anastasi, LLP

(57) ABSTRACT

An optical sensor assembly in which a four axis gimbal and dual coelostat mirror configuration provide pointing of the sensor line of sight in azimuth and elevation, stabilized for platform pitch. One example of a sensor system includes a first optical sub-system including a first plurality of optical elements, and a second optical sub-system configured to rotate about a first axis relative to the first optical sub-system. The second optical sub-system includes afocal foreoptics configured to direct a collimated beam of electromagnetic radiation to the first optical sub-system, a first coelostat minor configured to rotate about a second axis substantially perpendicular to the first axis, and a second coelostat mirror configured to rotate about a third axis substantially perpendicular to both the first axis and the second axis, and to receive electromagnetic radiation reflected by the first coelostat minor and to direct the electromagnetic radiation to the afocal foreoptics.

16 Claims, 7 Drawing Sheets

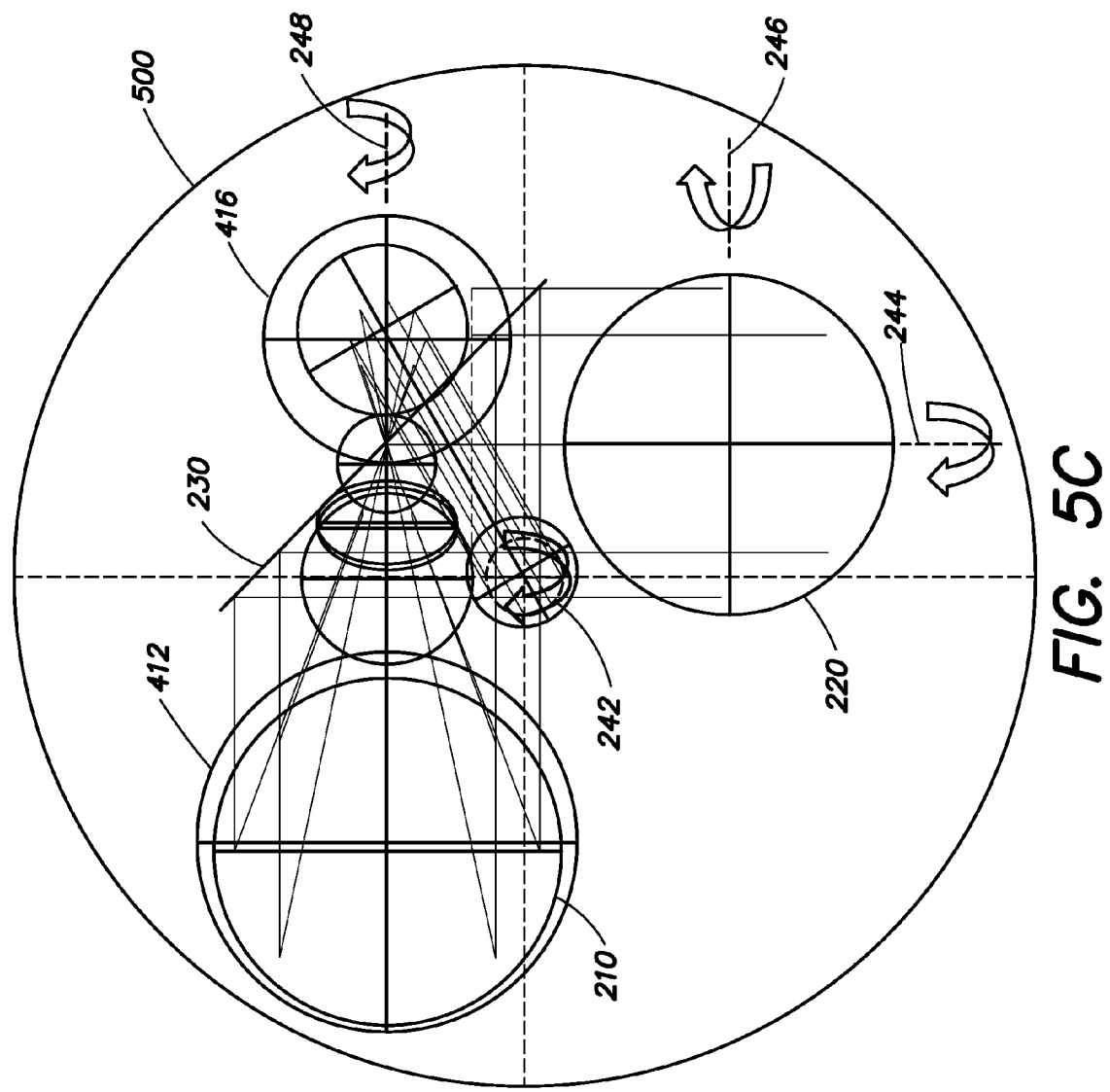

FOUR-AXIS GIMBALED AIRBORNE SENSOR HAVING A SECOND COELOSTAT MIRROR TO ROTATE ABOUT A THIRD AXIS SUBSTANTIALLY PERPENDICULAR TO BOTH FIRST AND SECOND AXES

BACKGROUND

There are numerous applications for imaging sensors that provide infrared search and track (IRST), targeting or stand-off reconnaissance functions, such as on an aircraft including an unmanned aerial vehicle (UAV) platform for standoff reconnaissance or on a jet aircraft for IRST, targeting (i.e., target location and designation) and standoff reconnaissance (e.g., survey or observation to collect image information). Additionally, some IRST systems include laser range-finding, and/or coherent laser detection and ranging (LADAR) capabilities. As its name indicates, an IRST system operates generally in the infrared wavelength range; however visible wavelength sensing capability is typically also desired within the IRST sensor.

Each of the IRST function, standoff reconnaissance function and targeting function has unique system requirements, including the significantly different fields of regard. For example, the IRST field of regard is very wide in azimuth (horizontal), but generally forward looking, whereas the standoff reconnaissance field of regard is wide in pitch (horizontal), but generally side looking. The targeting field of regard is generally very wide in elevation, and can extend from many degrees above the local horizon (forward) to many degrees past (behind) the local nadir (vertical) by as much as 60 degrees.

SUMMARY OF INVENTION

Aspects and embodiments relate to optical sensor systems in general and in particular to a multi-function airborne sensor system combining infrared search and track (IRST), targeting, and standoff reconnaissance functions in the same airborne sensor system. In particular, and as discussed in more detail below, a four-axis gimbal arrangement is used to provide wide angle field of regard in azimuth and elevation, stabilized for platform pitch.

According to one embodiment, a sensor system comprises a first optical sub-system including a first plurality of optical elements, and a second optical sub-system configured to rotate about a first axis relative to the first optical sub-system. The second optical sub-system includes an afocal foreoptics configured to receive electromagnetic radiation and to direct a collimated beam of the electromagnetic radiation to the first optical sub-system, a first coelostat mirror configured to rotate about a second axis substantially perpendicular to the first axis and to receive and reflect the electromagnetic radiation, and a second coelostat mirror configured to rotate about a third axis substantially perpendicular to both the first axis and the second axis, and to receive the electromagnetic radiation reflected by the first coelostat mirror and to direct the electromagnetic radiation to the afocal foreoptics.

In one example, the first axis is substantially parallel to the collimated beam of electromagnetic radiation output by the afocal foreoptics. In another example, the second axis forms an angle of approximately 45 degrees relative to a plane of the first coelostat mirror and the second axis is parallel to the electromagnetic radiation reflected by the first coelostat minor. In another example the third axis forms an angle of approximately 45 degrees relative to a plane of the second coelostat minor and the third axis is parallel to the electromagnetic radiation reflected by the second coelostat mirror. The second optical sub-system may further include a fold minor optically coupled between the afocal foreoptics and the second coelostat minor, the fold mirror being configured to receive the electromagnetic radiation from the second coelostat mirror and to reflect the electromagnetic radiation towards the afocal foreoptics. In one example, the afocal foreoptics includes a three minor anastigmat. In one example, the first plurality of optical element includes an optical imager and a detector, the optical imager being configured to receive the electromagnetic radiation from the second optical sub-system and to relay the electromagnetic radiation to the detector. The first plurality of optical elements may further include a derotation device configured to receive the collimated beam of the electromagnetic radiation from the second optical sub-system and to transmit the electromagnetic radiation towards the optical imager, the derotation device being configured to counter-rotate the collimated beam of the electromagnetic radiation so that an image output by the derotation device is in a same direction independent of a rotation of the first coelostat minor. In another example the first plurality of optical elements includes a laser module configured to emit a laser beam and an auto-alignment beam, the laser beam being directed towards the first coelostat minor via the afocal foreoptics. The auto-alignment beam may be used to determine a line of sight of the laser beam. According to one example, a rotation of the first coelostat minor about the second axis provides a travel of a field of regard of the sensor system in an elevation direction. The field of regard of the sensor system in the elevation direction may be greater than approximately 165 degrees, for example. According to another example, a rotation of the second optical sub-system around the first axis provides a travel of the field of regard in an azimuth direction. The field of regard of the sensor system in the azimuth direction may be greater than approximately 140 degrees, for example. In another example a rotation of the second coelostat minor about the third axis provides a travel of the field of regard in a pitch direction. The first coelostat minor may be further configured to rotate around a fourth axis substantially perpendicular to the second axis and in a plane of the first coelostat minor, wherein a rotation of the first coelostat mirror around the fourth axis prevents a gimbal singularity in which a line of sight direction substantially coincides with the first axis.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 5A-5C depict a lateral (side) view, a top view, and a front view respectively, of a ray trace of the on-gimbal optics of the sensor system of FIG. 3, according to aspects of the present invention.

DETAILED DESCRIPTION

Aspects and embodiments are directed to an optical configuration for a four-axis gimbaled dual coelostat airborne sensor system. As discussed above, there is a need for a multi-function airborne sensor which includes an optical configuration capable of supporting the various functions and pointing over wide angular ranges. As discussed in more detail below, a four-axis gimbaled dual coelostat airborne sensor system according to certain embodiments supports IRST, standoff reconnaissance, and targeting functions, while also providing agile compensation for platform pitch; a feature lacking in conventional airborne sensor systems.

Figure 1A:
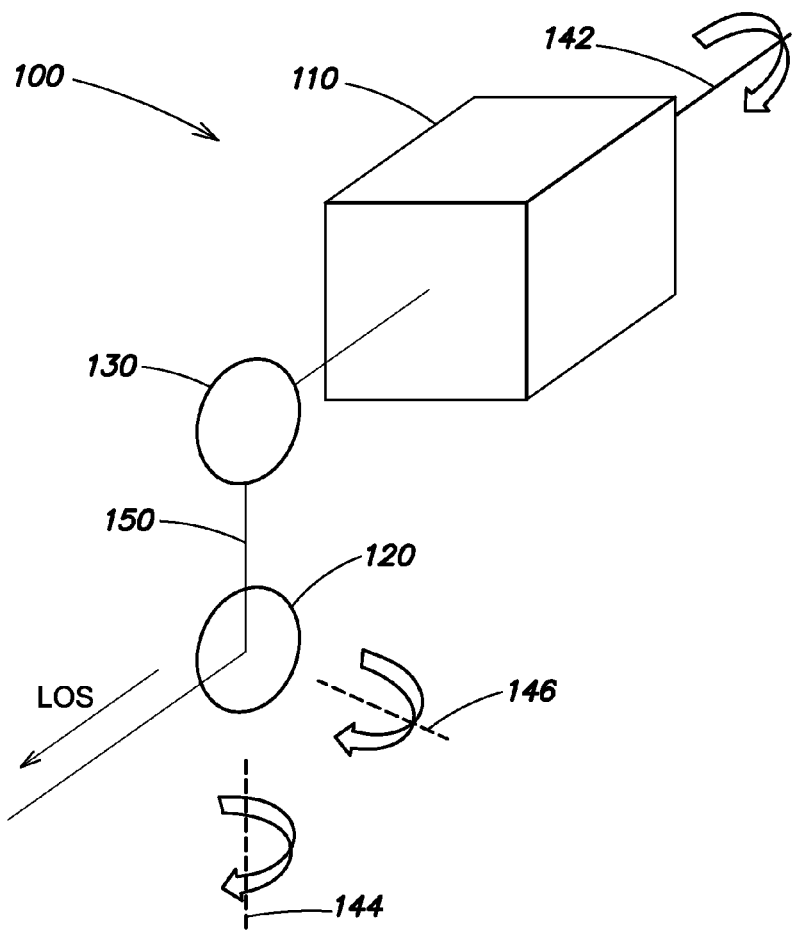
FIG. 1A is a block diagram of one example of the on-gimbal optics of a three-axis gimbaled sensor.
Figure 1B:
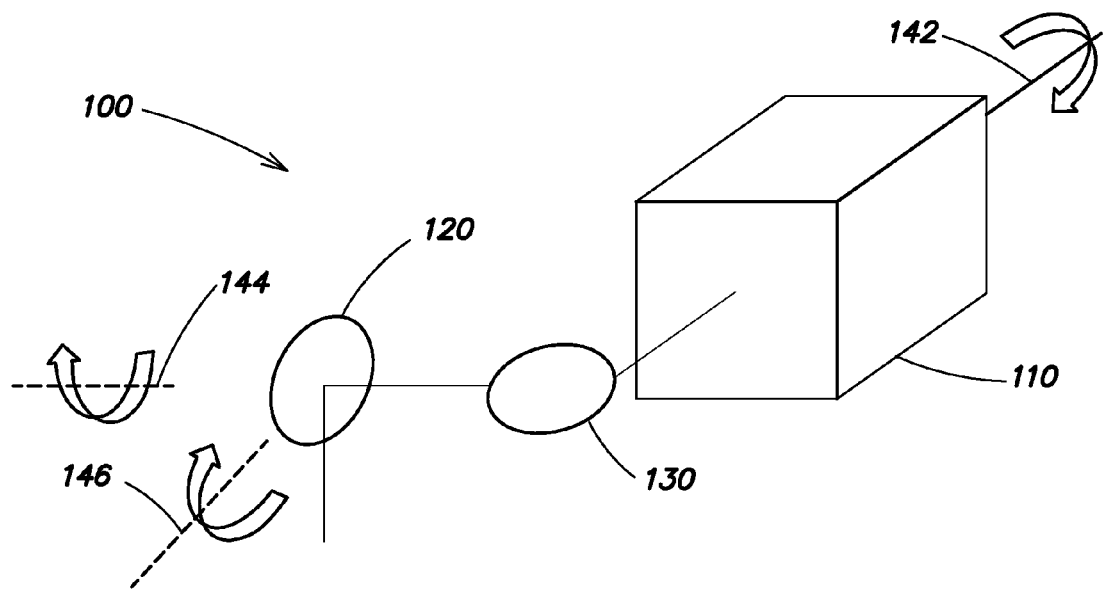
FIG. 1B is a block diagram illustrating the on-gimbal optics of the three-axis gimbaled sensor of FIG. 1A with 90 degree rotation about the roll axis relative to FIG. 1A.

U.S. PG Publication No. 2012/0292482, which is herein incorporated by reference in its entirety, describes a multi-function airborne sensor system capable of providing IRST, standoff reconnaissance, and targeting functions. Referring to FIGS. 1A and 1B, the on-gimbal portion of system 100 of U.S. PG Publication No. 2012/0292482 includes afocal fore-optics 110 coupled to a single coelostat minor 120 (also referred to as a pointing minor) via a fold mirror 130. The afocal foreoptics 110, coelostat mirror 120, and fold minor 130 are mounted on a roll gimbal that rotates about an outer-most roll axis 142. In an observation mode, such as a standoff reconnaissance mode or IRST mode, electromagnetic radiation from an object at far field is received by the coelostat minor 120 which is pointed in a direction of a scene or object being observed, i.e., pointed in a line of sight direction (LOS). The coelostat minor 120 to rotate around a rotation axis 144 that is parallel to the beam of radiation 150 reflected by the coelostat mirror 120, and perpendicular to the roll axis 142. The rotation axis 144 forms an angle of about 45 degrees relative to the surface plane of the coelostat minor 120, such that rotation of the coelostat minor 120 around the rotation axis 144 allows the coelostat mirror 120 to receive radiation from a scene or object at different elevation and azimuth angles while reflecting the received radiation in generally the same direction (direction of the reflected radiation beam 150) towards the fold minor 130. The fold minor 130 in turn directs the radiation toward the afocal fore-optics 120. Rotation around the roll axis 142 allows pointing of the coelostat mirror 120 in the azimuth or horizontal direction, with 90 degree rotation converting azimuth into elevation, as shown in FIG. 1B. Thus, rotation of the optics about the roll axis 142, and rotation of the coelostat minor 120 about the rotation axis 144 allows for scanning over a large field of regard in both azimuth and elevation.

As discussed in U.S. PG Publication No. 2012/0292482, generally when the coelostat minor 120 is oriented such that the line of sight direction is at a certain angle relative to the roll axis 142, rotation of the gimbal-mounted optics about the roll axis causes the line of sight direction to sweep out a cone centered about the roll axis. However, when the orientation of the coelostat mirror 120 is such that the sensor line of sight direction is precisely parallel to the roll axis 142, rotation of the gimbal-mounted optics about the roll axis does not change the line of sight direction. This situation where the roll axis cannot steer the line of sight is referred to as a gimbal singularity or gimbal lock. To address circumstances where the gimbal singularity cannot be avoided, for example, because the gimbal singularity is within the desired field of regard (FOR), a third gimbal axis 146 is provided. As shown in FIGS. 1A and 1B, the third gimbal axis 146 is within the plane of the coelostat mirror 120 and is perpendicular to the rotation axis 144. Additionally, the third gimbal axis 146 resides on the rotation axis 144 of the coelostat mirror 120 in that a rotation of the coelostat minor 120 around the rotation axis 144 produces a rotation of the third gimbal axis 146. The third gimbal axis 146 can be of small angular travel (for example, less than or equal to 5 degrees). As a result, the third gimbal axis 146 travels around the roll axis 142 and avoids the gimbal singularity. Thus, U.S. PG Publication No. 2012/0292482 describes a three-axis gimbaled multi-function airborne sensor that uses a single coelostat minor 120 to achieve line of sight pointing over a wide angular range in both azimuth and elevation.

Conventional airborne sensor systems generally have ability to maintain a desired pointing direction as the aircraft rolls and changes forward direction in azimuth. However, conventional systems generally cope poorly with significant changes in aircraft pitch. One approach to compensating for aircraft pitch uses the roll axis. However, as illustrated schematically in FIGS. 1A and 1B, there is typically significant hardware, including the complete afocal telescope 110, mounted on the roll axis. As a result, compensating for aircraft pitch by rotating the roll axis may require significant power to move the large associated mass, and also is not fast (or agile) and may not be particularly accurate. The problem is particularly challenging in the case of a multi-function airborne sensor, such as that discussed in U.S. PG Publication No. 2012/0292482, where alignment and pointing accuracy must be maintained for several different optical sub-systems performing different functions.

Figure 2A:
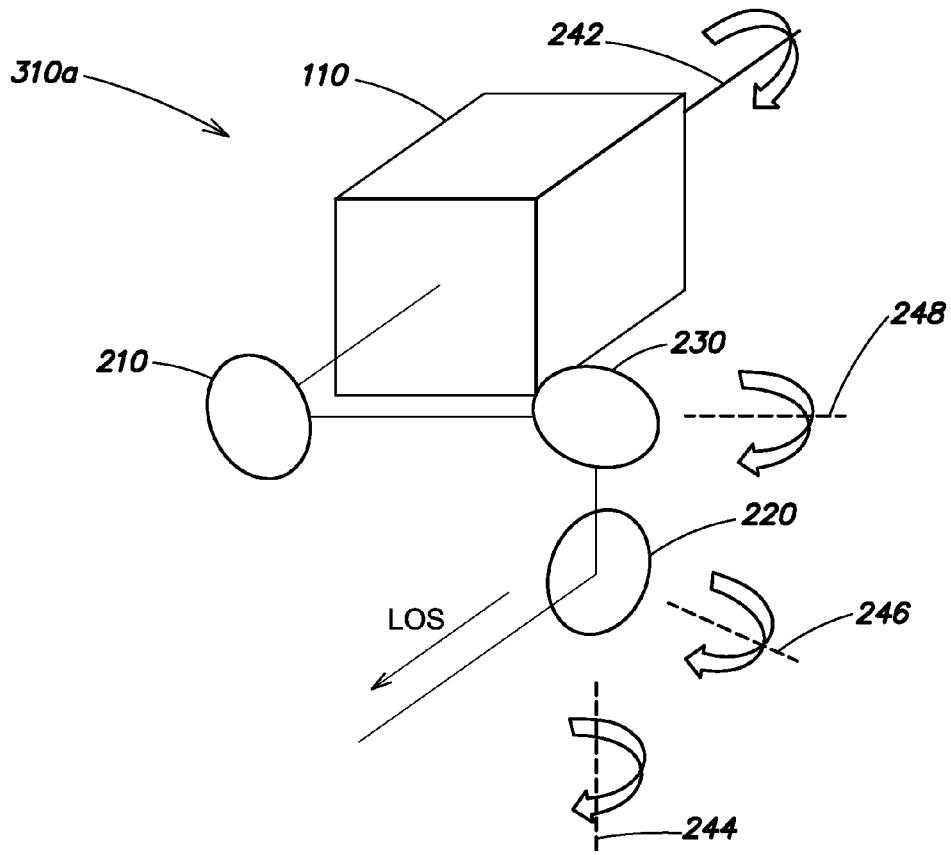
FIG. 2A is a block diagram of one example of the on-gimbal optics of a four-axis gimbaled sensor a according to aspects of the invention.
Figure 2B:
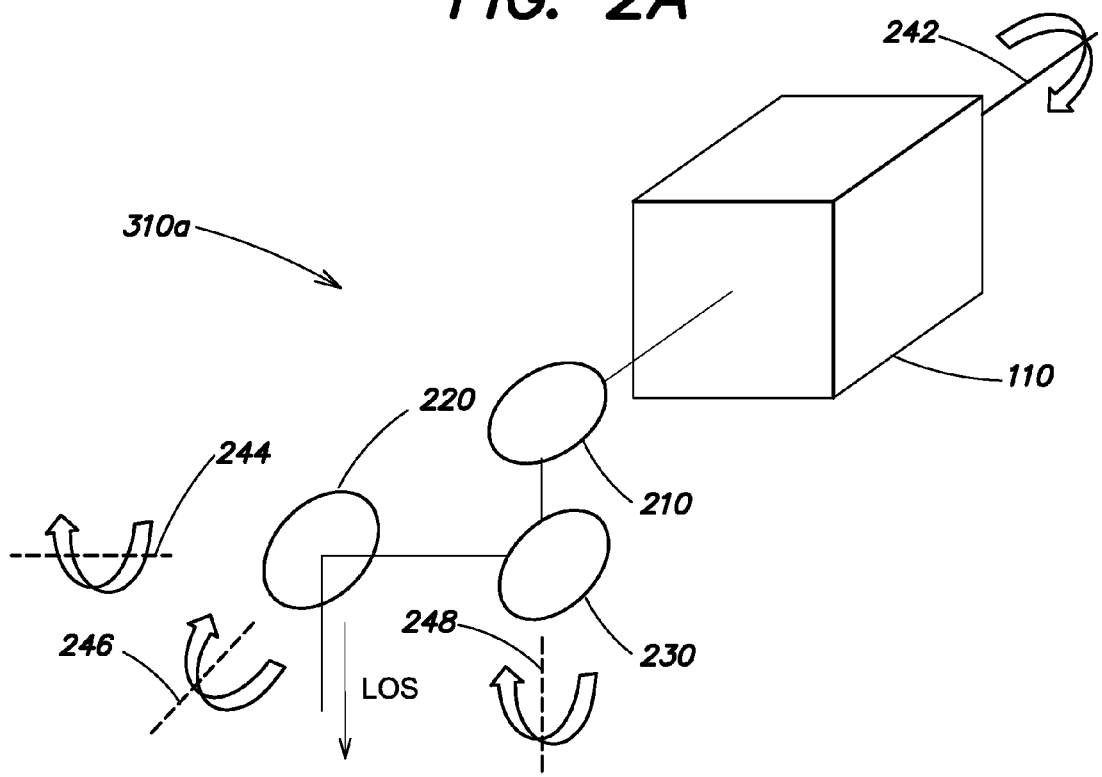
FIG. 2B is a block diagram illustrating the on-gimbal optics of the four-axis gimbaled sensor of FIG. 2A with 90 degree rotation about the roll axis relative to FIG. 2A.

Aspects and embodiments are directed to an optical configuration for an airborne sensor that allows for agile compensation of platform pitch while also maintaining all the functionality and advantages of the multi-function airborne sensor disclosed in U.S. PG Publication No. 2012/0292482. In particular, aspects and embodiments include a dual coelostat airborne sensor configuration that enables level horizon pointing when the platform is pitched at large angles. Referring to FIGS. 2A and 2B, a gimbaled optical portion 310a of an airborne sensor system according to one embodiment includes afocal foreoptics 110 optically coupled to a fold minor 210, a first coelostat mirror 220, and a second coelostat mirror 230. The first coelostat minor 220 corresponds to the coelostat minor 120 discussed above as used in a similar system. The afocal foreoptics 110, fold mirror 210, and first and second coelostat minors 220, 230 are mounted on a roll gimbal that rotates about an outermost roll axis 242 (first gimbal axis) that is generally parallel to the beam of electromagnetic radiation output by the afocal foreoptics 110. The first coelostat minor 220 rotates around a first rotation axis 244 (second gimbal axis) that is parallel to the beam of radiation 250a reflected by the first coelostat minor 220, and perpendicular to the roll axis 242, as discussed above. The second coelostat mirror 230 rotates around a second rotation axis 248 (third gimbal axis) that is parallel to the beam of radiation 250b reflected by the second coelostat mirror 220 and substantially perpendicular to the first rotation axis 244. This rotation of the second coelostat mirror 230 is used to compensate for pitching motion of the platform, thereby allowing the line of sight of the system to be maintained in a desired direction (determined by rotation of the first coelostat mirror 220 to a desired angle) even as the platform pitches over a relatively large angular range, as discussed further below. Rotation of the first coelostat minor 220 about a fourth gimbal axis 246 is used to compensate for a gimbal singularity, as also discussed above and further below.

Figure 3:
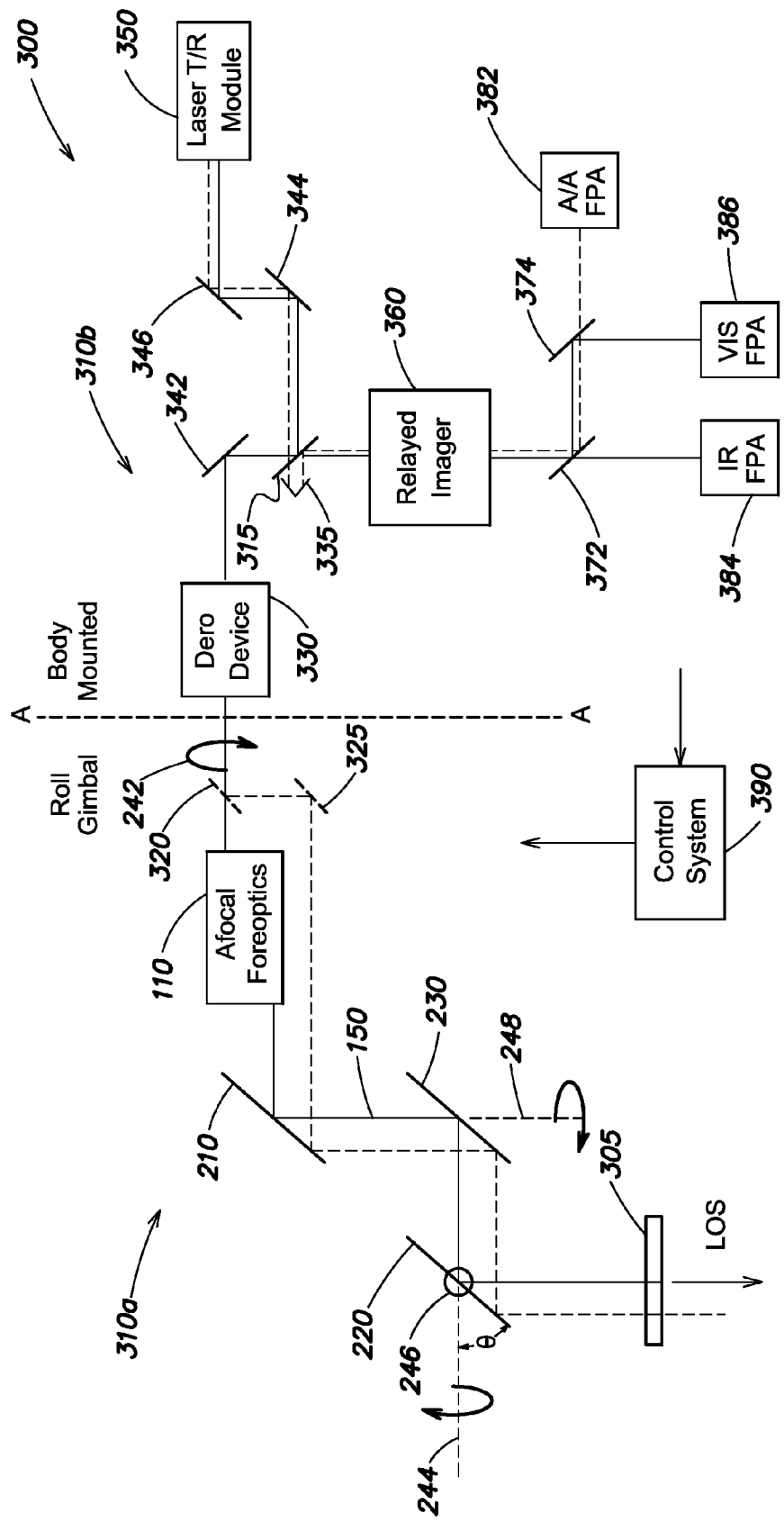
FIG. 3 is an optical block diagram of one example of a sensor system integrating the IRST function, the standoff reconnaissance function and the targeting function, according to aspects of the present invention.

Referring to FIG. 3, there is illustrated an optical block diagram of one example of a multi-function sensor system 300 integrating the IRST function, the standoff reconnaissance function and the targeting function, according to one embodiment. The sensor system 300 is configured to be mounted to a movable platform, such as an aircraft, for example. Accordingly, the sensor system 300 includes on-gimbal optics 310a (all components to the left of dotted line A-A) which are mounted on a roll gimbal that rotates about the roll axis 242 (discussed above with reference to FIGS. 2A and 2B), and off-gimbal, or body-mounted components 310b (all components to the right of dotted line A-A). As discussed in more detail below, the on-gimbal components 310a of the sensor system 300 include the afocal foreoptics 110 (typically a multi-minor afocal telescope), the first, azimuth (AZ) coelostat minor 220 (also referred to as an azimuth pointing minor), the second, elevation (EL) coelostat minor 230 (also referred to as an elevation pointing minor), one or more windows 305, the fold mirror 210, a wide field of view (WFOV) insert minor 320, and a by-pass minor 325. The body-mounted components 310b of the sensor system 300 include a derotation optical device 330, beam steering minors 342, 344, 346, a laser dichroic beam splitter (B/S) minor 315, a laser module 350, a beam direction preserving device (e.g., corner cube) 335, a multi-minor relayed imager or imaging optics 360, dichroic beam splitters (B/S) 372 and 374, an auto-alignment detector (e.g., a focal plane array) 382, an infrared detector or detectors (e.g., a focal plane array) 384, and a visible detector (e.g., a charge coupled device or CCD) 386. In one example, the body-mounted components 310b are mounted onto a structure that can be attached to the body of the airborne platform (e.g., an aircraft). The structure may be fixed relative to the body or movable relative to the body.

In observation mode such as standoff reconnaissance mode or IRST mode, radiation beam from an object at far field traversing one or more windows 305 is received by the first coelostat minor 220 which is pointed in a direction of a scene or object being observed, i.e., pointed in a line of sight direction (LOS). The first coelostat mirror 220 is configured to rotate around the first rotation axis 244, as discussed above. In one embodiment, the first rotation axis 244 forms an angle θ of about 45 degrees respective to the surface plane of the coelostat minor 220. Therefore, a rotation of the first coelostat minor 220 around the first rotation axis 244 enables the first coelostat minor 220 to receive radiation from a scene or object at different elevation and azimuth angles while reflecting the received radiation in generally the same direction (direction of the reflected radiation beam 150). The first coelostat minor 220 directs the received radiation beam towards the second coelostat minor 230. The second coelostat minor 230 is configured to rotate around the second rotation axis 248 to compensate for pitch of the platform on which the sensor is mounted, thereby allowing the first coelostat minor 220 to remain pointed in the desired azimuth and elevation direction even as the platform pitches.

The second coelostat mirror 230 directs the reflected radiation beam towards the fold minor 210 which in turn directs the radiation towards either the afocal fore-optics 110 or towards the bypass mirror 325. In one embodiment, the afocal fore-optics 110 comprises an afocal three-minor anastigmat telescope. However, any number (e.g., two or more) anastigmat minors may be used as desired. A collimated radiation beam from the object or scene at far field received by the afocal fore-optics 110 is output by the afocal fore-optics as a collimated radiation beam of generally smaller diameter but correspondingly larger field of view. The collimated radiation beam output by the afocal fore-optics 110 may be directed toward the derotation device 330. When the radiation beam passes through the afocal fore-optics 110, a relatively narrow field of view (NFOV) is achieved. In order to achieve a wider field of view (WFOV), the afocal fore-optics 110 is bypassed using the bypass minor 325 and the WFOV insert minor 320. The bypassed radiation beam is received by the bypass mirror 325 which reflects the radiation beam towards the WFOV insert minor 320. The WFOV insert minor 320 in turn is arranged to reflect the radiation beam toward the derotation device 330. Therefore, in the NFOV configuration, the WFOV insert minor 320 and the bypass minor 325 are moved away from the path of the radiation beam allowing only the radiation beam output by the afocal fore-optics 110 to reach the derotation device 330, whereas in the WFOV configuration, the bypass mirror 320 and WFOV mirror 325 are positioned in the path of the radiation beam so that the radiation beam bypasses afocal foreoptics 110 to reach the derotation device 330.

As discussed above, the roll gimbal rotates around the roll axis 242 generally perpendicular to the first rotation axis 244. Therefore, the on-gimbal components 310a of the sensor system 300 are configured to rotate around the roll axis 242 relative to the body-mounted components 310b. The roll axis 242 is parallel to the beam of radiation output by the afocal fore-optics 110 or parallel to the beam of radiation reflected by the WFOV insert mirror 325 (in the WFOV configuration). As discussed above, rotation around the roll axis 242 enables pointing the first coelostat mirror 220 in the azimuth direction or horizontal direction to enable the first coelostat mirror to receive radiation from a desired object or scene. However, due to this rotation around the roll axis 242, the image from the far field object or scene is also rotated. In order to correct for the rotation of the image, the derotation device 330 is configured to counter-rotate so that the image output by the derotation device is in the same direction independent of the rotation of roll gimbal around the roll axis 242 or the rotation of the first coelostat minor 220 around axis 244 or the rotation of the second coelostat minor 230 around axis 248. In one embodiment, the derotation device 330 is an optical prism. In other embodiments, the derotation device 330 may include reflective optical elements (e.g., minors) and can be, for example, an all-reflective derotation device. However, as it will be appreciated by those skilled in the art that other types of derotation devices can also be used. Furthermore, the derotation device 330 can be omitted, and the derotation function may be accomplished electronically or through image data processing. In other embodiments, the derotation device 330 may not be needed. For example, while the derotation function is used for the IRST function, advanced LADAR scanning, and standoff reconnaissance, the derotation function may not be needed or may be optional for targeting functions, ranging functions and designator operation.

The radiation beam output by the derotation device 330 is directed toward the beam steering mirror 342, which reflects the radiation beam towards the laser dichroic mirror 315. The laser dichroic mirror 315 is configured to transmit a portion of the radiation beam received from the beam steering mirror 342 towards the imager 360. As discussed further below, the laser dichroic mirror 315 is also configured to reflect a portion of the radiation beam received from the beam steering mirror 342 towards the beam steering mirrors 344 and 346 and into the laser module 350. In one embodiment, the imager 360 is a focal optical system configured to form a focal image on a detector (e.g., infrared focal plane array or IR FPA) 384 or detector (e.g., visible focal plane array or VIS FPA) 386, or both. In one embodiment, the imager 360 is an anastigmatic four-mirror system. However, the imager 360 may include any number of minors (e.g., two or more mirrors) as desired. In one example, the dichroic beam splitters 372 and 374 are used to direct the radiation beam output by the imager 360 towards either detector 384 or detector 386 depending upon the wavelength of the radiation. For example, if the radiation beam has both an infrared component and a visible component, the infrared portion of the radiation can be directed towards detector 384 while the visible portion of the radiation can be directed towards detector 386.

In a range finder mode, LADAR mode or targeting mode, the laser module 350 is used to output a laser beam for range finder, LADAR or targeting functions. The laser module 350 may output a beam of radiation (shown as a solid line in FIG. 3) of any desired wavelength including a beam in the infrared radiation wavelength range. The laser beam output by the laser module 350 is reflected by beam steering minors 346 and 344, and directed toward the laser dichroic mirror 315. The laser dichroic minor 315 reflects the laser beam toward the derotation device 330 which transmits the laser beam toward the afocal fore-optics 110. The laser beam exits the afocal fore-optics 110 and is directed by the fold mirror 210 towards the second coelostat minor 230. The second coelostat mirror 230 in turn reflects the laser beam towards the first coelostat mirror 220, which in turn reflects the laser beam towards the intended object or target.

In one embodiment, in order to track the direction of the laser beam, the laser module 350 is also configured to emit an auto-alignment beam (shown as a dotted line in FIG. 3) that is precisely co-aligned in direction to the laser beam. The auto-alignment beam may have a different wavelength than the laser beam, and may have less intensity than the laser beam. Similar to the laser beam, the auto-alignment beam is reflected by the beam steering mirrors 346 and 344 towards the laser dichroic minor 315. The laser dichroic minor 315 is configured to transmit a portion of the auto-alignment beam when incident on one of the faces (front face) of the dichroic mirror. Therefore, in order to enable the laser dichroic mirror 315 to reflect the auto-alignment beam towards the imager 360 and still preserve the desired line of sight data indicative of the direction of the laser beam, a corner cube or prism 335 is used to reflect the auto-alignment beam back towards the back face of the laser dichroic minor 315. The back face of the laser dichroic minor 315 is configured to reflect a portion of the auto-alignment beam toward the imager 360. The imager 360 transmits the auto-alignment beam towards the beam splitter 372 which directs the auto-alignment beam towards the beam splitter 374. Beam splitter 372 is configured to reflect the auto-alignment beam and transmit the infrared radiation beam output by the imager 360. The beam splitter 374 is configured to transmit the auto-alignment beam towards the auto-alignment detector (e.g., auto-alignment FPA) 382 and reflect the visible radiation output by the imager 360 towards the detector 386. The auto-alignment detector 382 is used to detect the laser boresight direction relative to lines of sights of the detectors 384 and 386.

The auto-alignment beam is used to determine the line of sight (LOS) direction of the laser, i.e., to determine the location where the laser beam is pointing to. By using the above described optical arrangement, the auto-alignment beam "follows" the laser beam regardless of the position of the beam steering minors 344 and 346 or the laser dichroic minor 315. In other words, the laser beam and the auto-alignment beam have a common optical path from the laser module 350 through the imager 360. Therefore, when the laser beam is steered using beam steering minors 344 and 346 and/or laser dichroic minor 315, the auto-alignment is also steered in the same manner, such that the auto-alignment beam (dotted line) and the laser beam (solid line) follow substantially the same path (as shown in FIG. 3).

However, with respect to the dichroic mirror 315, the laser beam is reflected by the front face of dichroic minor 315 towards beam steering minor 342 which in turn directs the laser beam towards the derotation device 330 while the auto-alignment beam is transmitted through dichroic minor 315. Therefore, in order to reflect the auto-alignment off of the laser dichroic mirror 315, the corner cube or prism 335 is positioned in the path of the transmitted auto-alignment beam. As discussed above, the corner cube or prism 335 is configured and arranged to reflect the auto-alignment beam onto the back face of the laser dichroic minor 315. The back face of laser dichroic minor 315 is configured to reflect a portion of the auto-alignment beam towards the imager 360. By reflecting the auto-alignment on the back face of dichroic minor 315 and reflecting the laser beam on the front face of the dichroic mirror 315, a rotation of the dichroic mirror 315 will affect the orientation of both the laser beam and the auto-alignment beam in a precisely similar manner. Therefore, the auto-alignment beam "tracks" the laser beam regardless of the position of beam steering mirrors 344 and 346 and the dichroic minor 315. As a result, by determining the position of the auto-alignment beam using auto-alignment detector (e.g., A/A FPA) 382, the line of sight or boresight of the laser beam can be determined with considerable accuracy.

Figure 4:
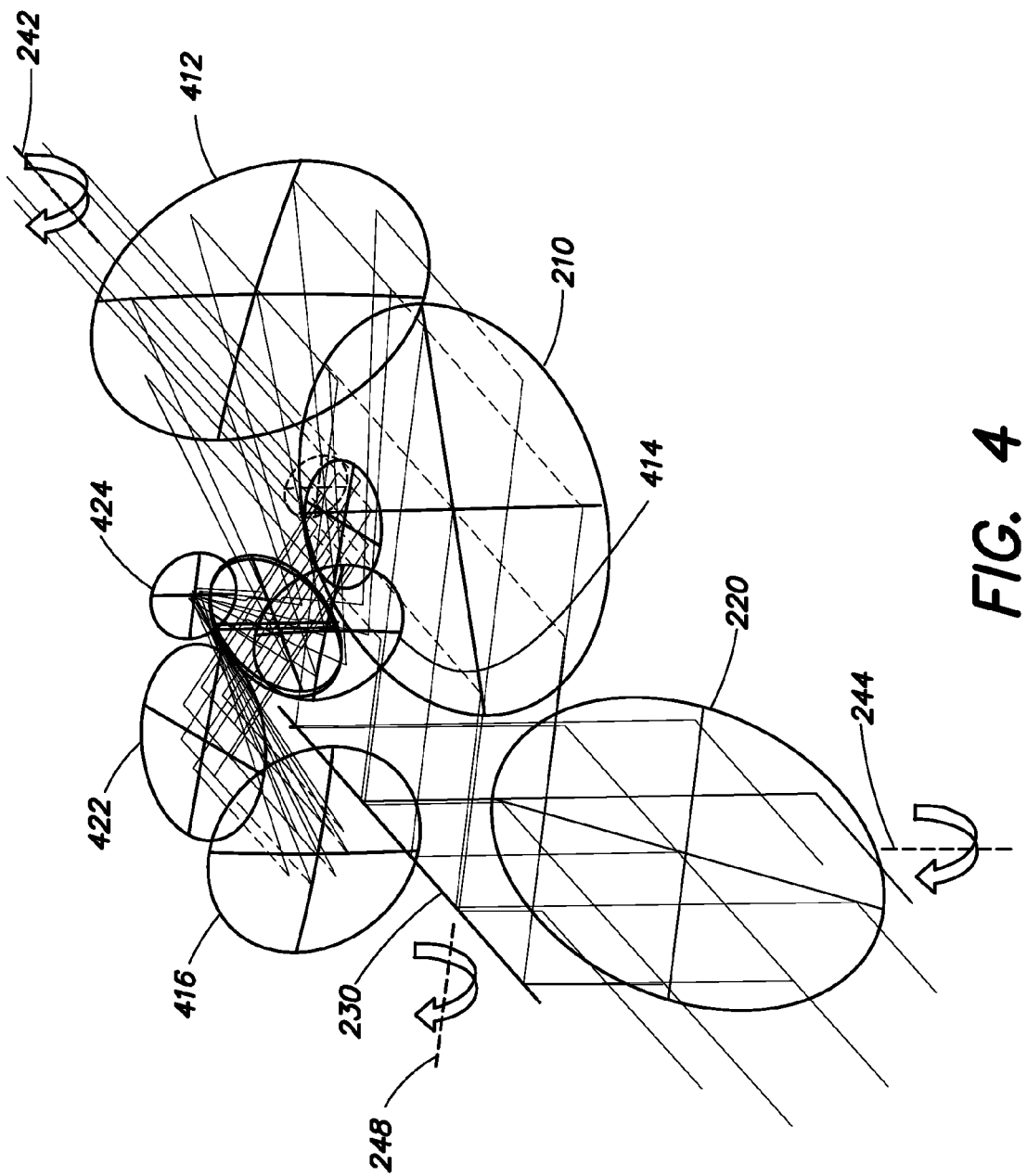
FIG. 4 is a ray trace of one example of the on-gimbal optical sub-system of the sensor system of FIG. 3 according to aspects of the present invention.
Figure 5A:
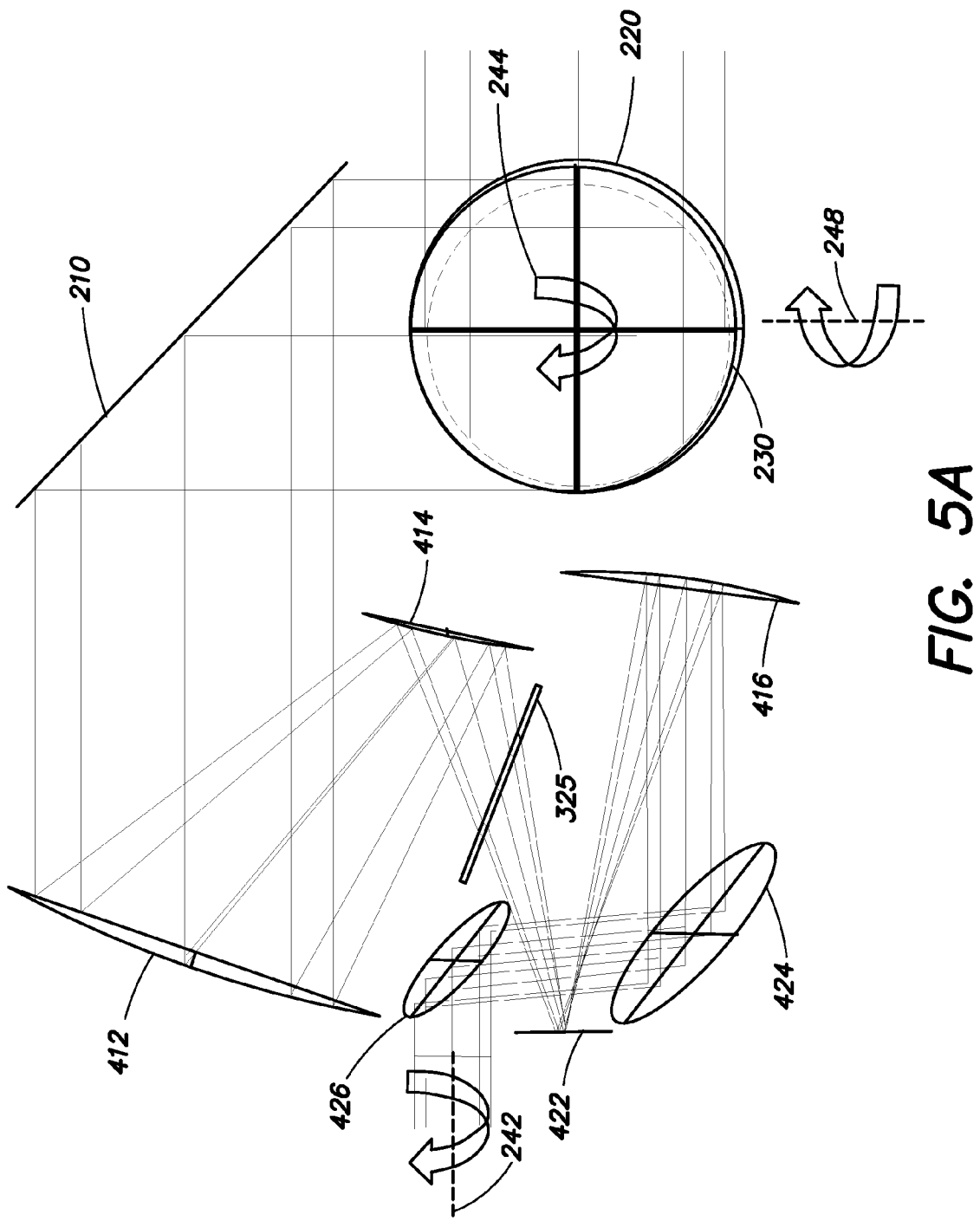
Figure 5B:
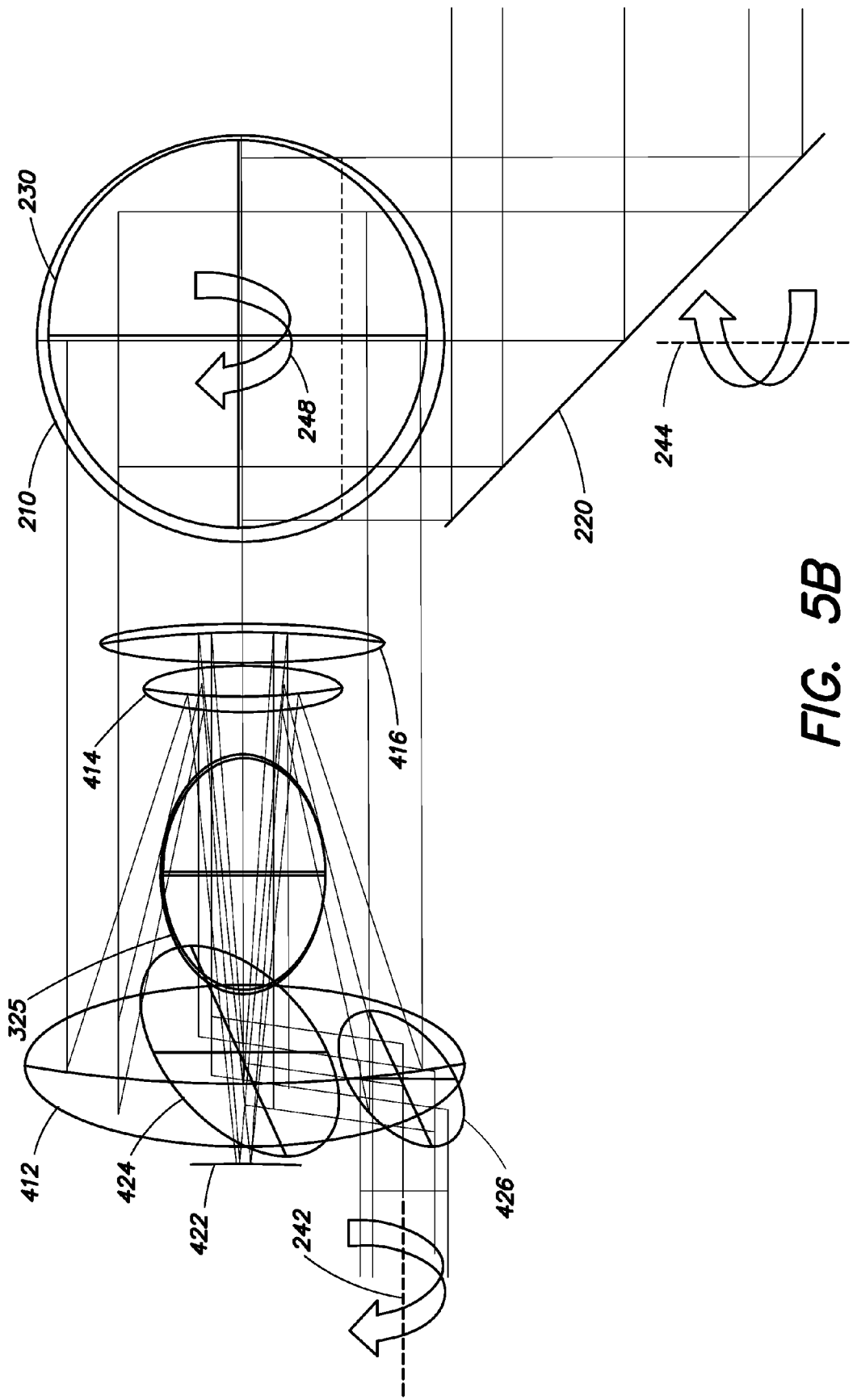

FIG. 4 depicts a ray trace of the on-gimbal optics of the sensor system 310a according to one embodiment. FIGS. 5A-5C further depict different views of the ray trace of the on-gimbal optics of the sensor system 310a according to one embodiment. FIG. 5A is a lateral view of the ray trace, FIG. 5B is a top view of the ray trace, and FIG. 5C is a front view of the ray trace. FIG. 5C also illustrates a cylinder swept volume as circle 500. The cylinder swept volume 500 corresponds to the volume occupied by the various optical elements of sensor system 310a, i.e., the volume swept by the path of radiation beam. In one embodiment, as shown in FIG. 5C, a diameter of cylinder swept volume 500 is approximately 2.5 times the diameter of the aperture approximately defined by the first coelostat mirror 220, which provides a sensor system with an efficient package.

In the illustrated example, the afocal foreoptics 110 is an all-reflective optical assembly and includes a primary mirror 412, a secondary minor 414, and a tertiary mirror 416. The afocal foreoptics also includes fold minors 422, 424, and 426 to direct the collimated beam from the tertiary mirror towards the derotation device 330 (not shown in FIGS. 4 and 5A-C) along a line parallel to the roll axis 242. In certain embodiments, the imager 360 may also be an all-reflective optical assembly. By using all-reflective optical assemblies for the afocal foreoptics 110 and the imager 360, chromatic aberrations or restrictions can be minimized or mitigated. Also, by providing all-reflective optical assemblies, a common optical path can be provided for all passive function and active functions thus achieving desired boresight characteristics for both functions. In addition, by using all reflective optical assemblies, first order thermal sensitivity can be minimized.

According to one embodiment, the first rotation axis 244 of the first coelostat mirror 220 is provided in close proximity to the one or more windows 305. As a result, the size of the window(s) 305 may be minimized while providing sufficient space for the first coelostat mirror 220 to rotate around axis 244 to scan in the elevation and azimuth directions. In one embodiment, the window(s) 305 may be provided as segmented windows in the elevation direction. In one example the window(s) 305 are slaved to the roll gimbal in the sense that the window(s) 305 rotate around the roll axis 242 in response to the use of the roll axis 242 in covering the desired field of regard. In another example, the window(s) 305 are not slaved in the elevation direction in the sense that the window(s) 305 do not rotate with rotation of the first coelostat minor 220 around axis 244. In another example, the window(s) 305 are not slaved in either the elevation direction or in the roll direction in the sense that the window(s) 305 do not rotate with rotation of the first coelostat mirror 220 around axis 244, nor with the roll axis 242. In this example, the window(s) may be sized so as to provide the desired field of regard in the elevation direction and/or the azimuth direction.

The first coelostat minor 220 may be rotated around the first rotation axis 244 to produce a wide field of regard travel in the elevation direction to locate, track or identify a scene or an object in the elevation direction, as desired in a targeting mode, according to one embodiment. The first coelostat minor 220 may be oriented at an angle about nadir direction to stare or scan in a generally forward-downward or backward-downward line of sight (LOS) direction, depending on the angle. The first coelostat minor 220 may be oriented generally at a nadir direction to stare or scan in a generally downward LOS direction. When considering the forward direction as a reference direction equal to 0 degrees (and generally parallel to the roll axis 242), the range of elevation angles may be between about +15 degrees and about −150 degrees. Therefore, a field of regard greater than about 165 degrees may be achieved in the elevation direction.

As discussed above with reference to FIGS. 2A and 2B, 90 degree rotation of the on-gimbal optics 310a about the roll axis 242 turns azimuth into elevation, and vice versa. Accordingly, in this configuration the first coelostat mirror 220 may be rotated around the first rotation axis 244 to produce a travel in the azimuth direction to locate, track or identify a scene or an object in the azimuth direction, as desired in an IRST mode, according to one embodiment. Thus, the sensor system 300 may have the ability to scan or stare objects or scenes in a wide range of azimuth angles as well as elevation angles. For example, when considering the forward direction as a reference direction equal to 0 degrees, the range of azimuth angles may be between about ±180 degrees, i.e., approximately a full 360 degrees. Therefore, a field of regard greater than about 140 degrees may be achieved in the azimuth direction.

As discussed above, when the orientation of the first coelostat minor 220 is such that the sensor line of sight direction is precisely parallel to the roll axis 242, rotation of the gimbal-mounted optics about the roll axis does not change the line of sight direction. This situation where the roll axis cannot steer the line of sight is referred to as a gimbal singularity or gimbal lock. In certain circumstances where the gimbal singularity cannot be avoided, for example because the gimbal singularity is within the desired field of regard (FOR), a fourth gimbal axis 246 may be provided within the plane of the first coelostat mirror 220 and perpendicular to the first rotation axis 244. In one embodiment, the fourth gimbal axis 246 resides on the first rotation axis 244 of the first coelostat minor 220 in that a rotation of the first coelostat minor 220 around the first rotation axis 244 produces a rotation of axis 246. The fourth gimbal axis 246 may be of small angular travel (for example, less than or equal to 5 degrees). As a result, axis 246 travels around the roll axis 242 and avoids the gimbal singularity.

For example, referring again to FIG. 3, when an object being continuously tracked by moving the first coelostat minor 220 in various directions by rotating around the first rotation axis 244 and/or around roll axis 242 and/or optional fourth axis 246 using control system 390 is projected to go close to or through the gimbal singularity, and optional fourth gimbal axis 246 is provided with a range of angles (for example, ±3 degrees), the roll axis 242 is no longer used for tracking the object within the ±3 degree range that surrounds the gimbal singularity. Instead, the first rotation axis 244 and fourth gimbal axis 246 are used to continue to track the object within the ±3 degree angular range. When, on the other hand, the object location exceeds, for example, the ±3 degree singularity, the roll axis 242 is used by control system 390 in the tracking motion. In this case, the fourth axis 246 may be gradually returned to 0 degrees and no longer has involvement in the tracking motion. In other words, control system 390 controls the tracking by rotating the first coelostat mirror 220 around the fourth gimbal axis 246 when an object is located closely around the singularity (e.g., within the ±3 degree range). Otherwise, when the object is outside the ±3 degree range around the singularity, control system 390 controls the tracking by rotating the roll axis 242 and leaving the fourth axis 246 fixed or returning the third axis to 0 degrees.

As discussed above, a third gimbal axis, namely the second rotation axis 248 and the second coelostat mirror 230 may be used to compensate for platform pitch, allowing the first three gimbal axes (242, 244, and 246) to be used for tracking the object or scanning without significant disruption due to platform pitch. This compensation for platform pitch angle may be accomplished over a very large angular range, for example, in excess of +/−45 degrees in elevation. In certain embodiments, the range of pitch angle compensation may only be limited by the field of regard of the window assembly 305, based on the design and geometry of that assembly, rather than by any limitations of the second coelostat mirror 230, or its range of travel.

Embodiments of the sensor system 300 may be capable of providing IRST, targeting, and standoff reconnaissance sensing functions utilizing either linear 1-D detector arrays operating in a scanning mode, or 2-D (e.g., square, rectangular or circular) detector arrays operating in either staring or step-staring modes, or in any combination of these modes. For example, IRST type sensing can equally well be accomplished by either scanning a linear array or step-staring a square/rectangular array. In one embodiment, target sensing can be performed preferably by staring with a square/rectangular array because of the continuous coverage on the target, but target sensing can also be performed by scanning a linear array. Standoff reconnaissance can equally well be accomplished by either scanning a linear array or step-staring a square/rectangular array. All particular hardware features and functions that are needed for these three modes (scanning, staring, and step-staring) are provided by the sensor system described herein.

Scanning with a linear 1-D array may require a smooth continuous motion of the line of sight (LOS) that is strictly maintained orthogonal to the long dimension of the linear array. This can be accomplished by a coordinated operation of the fourth axis 246, the first rotation axis 244, the roll axis 242, the second rotation axis 248, the derotation device 330, and the beam steering minor 342, for example, using control system 390. Staring with a square/rectangular 2-D array, particularly during target tracking, may also require stable and smooth motion of the line of sight (LOS) that matches that of the target and may optionally require that a certain detector orientation be preserved. This can also be accomplished by coordinated operation of the fourth axis 246, the first rotation axis 244, the roll axis 242, the second rotation axis 248, the derotation device 330, and the beam steering mirror 342, for example, using control system 390. Step-staring a square/rectangular 2-D detector array is slightly more complex when this mode is used for wide area search functions in IRST or stand-off reconnaissance sensing. In certain circumstances, continuous and smooth motions of the fourth axis 246, the first rotation axis 244, the roll axis 242, the second rotation axis 248, and the derotation device 330 may cause motion of the 2-D array orthogonal to one of its sides. However, the array line of sight should be fixed and still in inertial space during the frame integration time of each exposure, typically measured in milliseconds. Motion of beam steering mirror 342 can be used to momentarily cancel the scanning effects of motion of the fourth axis 246, the first rotation axis 244, the roll axis 242, the second rotation axis 248, and the derotation device 330 for a small angle (measured in milliradians) and a relatively short period of time (e.g., few milliseconds). This operation of beam steering minor 342 is commonly termed "back-scan," and the direction of the back-scan is held in constant orientation to the detector arrays because beam steering minor 342 is between the derotation device 330 and passive radiation detectors (e.g., FPAs) 384 and 386. For certain applications where the continuous scan motion is very fast, and the frame integration time is relatively long, the back-scan angle can be somewhat large (e.g., many milliradians). For such situations, it may be advantageous to have two beam steering minors instead of a single mirror at the location of beam steering mirror 342. This is easily accommodated within the sensor system, and the operation of two beam steering minors can be used to decrease or eliminate beam walk or wander on the fore-optics primary minor 412. This use of two beam steering mirrors for the elimination of beam wander on the fore-optics primary minor is accomplished in the active laser path by the operation of beam steering mirrors 344 and 346.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that embodiments of the methods and apparatuses discussed herein are not limited in application to the details of construction and the arrangement of components set forth in the above description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting.

The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. The scope of the invention should be determined from proper construction of the appended claims, and their equivalents.

What is claimed is:

1. A sensor system comprising:
   a first optical sub-system including a first plurality of optical elements;
   a second optical sub-system configured to rotate about a first axis relative to the first optical sub-system, the second optical sub-system including:
      an afocal foreoptics configured to receive electromagnetic radiation and to direct a collimated beam of the electromagnetic radiation to the first optical sub-system;
      a first coelostat mirror configured to rotate about a second axis substantially perpendicular to the first axis and to receive and reflect the electromagnetic radiation; and
      a second coelostat mirror configured to rotate about a third axis substantially perpendicular to both the first axis and the second axis, and to receive the electromagnetic radiation reflected by the first coelostat mirror and to direct the electromagnetic radiation to the afocal foreoptics.

2. The sensor system of claim 1, wherein the first axis is substantially parallel to the collimated beam of electromagnetic radiation output by the afocal foreoptics.

3. The sensor system of claim 1, wherein the second axis forms an angle of approximately 45 degrees relative to a plane of the first coelostat mirror and the second axis is parallel to the electromagnetic radiation reflected by the first coelostat minor.

4. The sensor system of claim 1, wherein the third axis forms an angle of approximately 45 degrees relative to a plane of the second coelostat minor and the third axis is parallel to the electromagnetic radiation reflected by the second coelostat minor.

5. The sensor system of claim 1, wherein the second optical sub-system further includes a fold minor optically coupled between the afocal foreoptics and the second coelostat mirror, the fold mirror being configured to receive the electromagnetic radiation from the second coelostat minor and to reflect the electromagnetic radiation towards the afocal foreoptics.

6. The sensor system of claim 1, wherein the afocal foreoptics includes a three mirror anastigmat.

7. The sensor system of claim 1, wherein the first plurality of optical elements includes an optical imager and a detector, the optical imager being configured to receive the electromagnetic radiation from the second optical sub-system and to relay the electromagnetic radiation to the detector.

8. The sensor system of claim 7, wherein the first plurality of optical elements further includes a derotation device configured to receive the collimated beam of the electromagnetic radiation from the second optical sub-system and to transmit the electromagnetic radiation towards the optical imager, the derotation device being configured to counter-rotate the collimated beam of the electromagnetic radiation so that an image output by the derotation device is in a same direction independent of a rotation of the first coelostat mirror.

9. The sensor system of claim 1, wherein the first plurality of optical elements includes a laser module configured to emit a laser beam and an auto-alignment beam, the laser beam being directed towards the first coelostat minor via the afocal foreoptics.

10. The sensor system of claim 9, wherein the auto-alignment beam is used to determine a line of sight of the laser beam.

11. The sensor system of claim 1, wherein a rotation of the first coelostat minor about the second axis provides a travel of a field of regard of the sensor system in an elevation direction.

12. The sensor system of claim 11, wherein the field of regard of the sensor system in the elevation direction is greater than approximately 165 degrees.

13. The sensor system of claim 11, wherein a rotation of the second optical sub-system around the first axis provides a travel of the field of regard in an azimuth direction.

14. The sensor system of claim 13, wherein the field of regard of the sensor system in the azimuth direction is greater than approximately 140 degrees.

15. The sensor system of claim 11, wherein a rotation of the second coelostat mirror about the third axis provides a travel of the field of regard in a pitch direction.

16. The sensor system of claim 1, wherein the first coelostat mirror is further configured to rotate around a fourth axis substantially perpendicular to the second axis and in a plane of the first coelostat minor, wherein a rotation of the first coelostat mirror around the fourth axis prevents a gimbal singularity in which a line of sight direction substantially coincides with the first axis.

* * * * *